US 12,054,161 B2

(12) United States Patent
Cao et al.

(10) Patent No.: US 12,054,161 B2
(45) Date of Patent: Aug. 6, 2024

(54) TRACTION MOTOR BASED WHEEL SPEED RECOVERY

(71) Applicant: GM GLOBAL TECHNOLOGY OPERATIONS LLC, Detroit, MI (US)

(72) Inventors: Yu Cao, Courtice (CA); Milad Alekajbaf, North York (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 295 days.

(21) Appl. No.: 17/690,151

(22) Filed: Mar. 9, 2022

(65) Prior Publication Data

US 2023/0286517 A1 Sep. 14, 2023

(51) Int. Cl.
| | |
|---|---|
| *B60W 40/105* | (2012.01) |
| *B60L 15/20* | (2006.01) |
| *B60W 10/08* | (2006.01) |
| *B60W 10/18* | (2012.01) |
| *B60W 10/20* | (2006.01) |
| *B60W 10/22* | (2006.01) |
| *B60W 50/00* | (2006.01) |

(52) U.S. Cl.
CPC .......... *B60W 40/105* (2013.01); *B60L 15/20* (2013.01); *B60W 10/08* (2013.01); *B60W 10/18* (2013.01); *B60W 10/20* (2013.01); *B60W 10/22* (2013.01); *B60W 50/00* (2013.01); *B60L 2240/42* (2013.01); *B60L 2240/461* (2013.01); *B60W 2050/0031* (2013.01); *B60W 2510/10* (2013.01); *B60W 2510/22* (2013.01); *B60W 2520/28* (2013.01); *B60W 2710/081* (2013.01)

(58) Field of Classification Search
CPC .................................................. B60W 40/105
See application file for complete search history.

(56) References Cited

U.S. PATENT DOCUMENTS

| | | | | |
|---|---|---|---|---|
| 7,739,016 | B2 * | 6/2010 | Morris | B60K 6/365 |
| | | | | 303/112 |
| 9,218,695 | B2 * | 12/2015 | Yu | B60T 8/885 |
| 9,555,783 | B2 * | 1/2017 | Premkumar | B60T 8/172 |
| 9,701,289 | B2 * | 7/2017 | Zhang | B60T 8/175 |
| 2023/0286517 | A1 * | 9/2023 | Cao | B60L 15/20 |

OTHER PUBLICATIONS

Design and Implementation of an Electric Differential for Traction Application (Year: 2010).*

* cited by examiner

*Primary Examiner* — Michael A Berns
(74) *Attorney, Agent, or Firm* — CANTOR COLBURN LLP (57) ABSTRACT

Method and apparatus for wheel speed estimation include an electrical powertrain having an electric motor providing a motor speed, a wheel, and a mechanical coupling between the motor and the wheel, and an electronic control unit calculating an estimated wheel speed based on the motor speed and mechanical dynamic models of the electrical powertrain.

18 Claims, 3 Drawing Sheets

TRACTION MOTOR BASED WHEEL SPEED RECOVERY

INTRODUCTION

This disclosure is related to electric vehicles.

Electric vehicles may be equipped with rotational speed sensors at various places within the electric drive system. Rotational speed may be used for various functions and controls. Speed sensing of electric drive system motors may be used in the control of such motors. Speed sensing of drive wheels may be used for a variety of propulsion, suspension, steering and braking subsystem related controls. Loss of drive wheel speed sensing at any wheel of the vehicle may negatively impact the performance of systems which rely upon individual drive wheel speed sensing. Moreover, wheel speed sensing may have limited resolution at low vehicle speeds which may negatively impact the performance of systems which rely upon accurate wheel speed sensing at low vehicle speeds.

SUMMARY

In one exemplary embodiment, an apparatus for wheel speed estimation may include an electrical powertrain having an electric motor providing a motor speed, a wheel, and a mechanical coupling between the motor and the wheel, and an electronic control unit calculating an estimated wheel speed based on the motor speed and mechanical dynamic models of the electrical powertrain.

In addition to one or more of the features described herein, the electronic control unit may synchronize the motor speed to a sensed wheel speed.

In addition to one or more of the features described herein, the electronic control unit may process a sensed wheel speed.

In addition to one or more of the features described herein, the mechanical coupling between the motor and the wheel may include a gear box and a drive axle.

In addition to one or more of the features described herein, the mechanical dynamic models of the electrical powertrain may include the drive axle modeled as an active component including a torsional spring constant, a torsional damping constant, a rotation angle at an output of the gear box, and a rotation angle at the wheel.

In addition to one or more of the features described herein, the mechanical dynamic models of the electrical powertrain may further include an equivalent rotational model of the electric motor and the gear box.

In addition to one or more of the features described herein, the estimated wheel speed may be calculated from a second order transfer function derived from the mechanical dynamic models of the electrical powertrain.

In addition to one or more of the features described herein, the electric motor providing a motor speed may include the electric motor providing the motor speed based upon a motor encoder.

In another exemplary embodiment, a method for wheel speed estimation in an electrical powertrain may include driving a wheel with an electric motor and calculating an estimated wheel speed based on a speed of the electric motor and mechanical dynamic models of the electrical powertrain.

In addition to one or more of the features described herein, the speed of the electric motor may be synchronized to a sensed wheel speed.

In addition to one or more of the features described herein, the electrical powertrain may include a drive axle mechanically coupled between the wheel and the electrical motor, and the mechanical dynamic models of the electrical powertrain may include the drive axle modeled as an active component including a torsional spring constant, a torsional damping constant, a rotation angle at an input end of the drive axle, and a rotation angle at the wheel.

In addition to one or more of the features described herein, the electrical powertrain may further include a gear box mechanically coupled between the electrical motor and the drive axle, and the mechanical dynamic models of the electrical powertrain may further include an equivalent rotational model of the electric motor and the gear box.

In addition to one or more of the features described herein, the estimated wheel speed may be calculated from a second order transfer function derived from the mechanical dynamic models of the electrical powertrain.

In yet another exemplary embodiment, an electric motor driven vehicle may include an electrical powertrain having an electrical drive unit including an electric motor mechanically coupled to an input of a gear box, and a motor controller providing a motor speed from an encoder. The electrical powertrain may also have a wheel and a drive axle mechanically coupling the wheel to an output of the gear box. The electric motor driven vehicle may also include an electronic control unit calculating an estimated wheel speed based on the motor speed and mechanical dynamic models of the electrical powertrain, processing sensed wheel speed from a wheel speed sensor, and providing the sensed wheel speed and the estimated wheel speed to a vehicle subsystem controlled based on wheel speed information.

In addition to one or more of the features described herein, the vehicle subsystem may include at least one of an electrical propulsion subsystem, a suspension subsystem, a steering subsystem, and a braking subsystem.

In addition to one or more of the features described herein, the mechanical dynamic models of the electrical powertrain may include the drive axle modeled as an active component including a torsional spring constant, a torsional damping constant, a rotation angle at an output of the gear box, and a rotation angle at the wheel.

In addition to one or more of the features described herein, the mechanical dynamic models of the electrical powertrain may further include an equivalent rotational model of the electric motor and the gear box.

In addition to one or more of the features described herein, the estimated wheel speed may be calculated from a second order transfer function derived from the mechanical dynamic models of the electrical powertrain.

In addition to one or more of the features described herein, the estimated wheel speed may be used by the vehicle subsystem when the sensed wheel speed is faulty.

In addition to one or more of the features described herein, the estimated wheel speed may be used by the vehicle subsystem at low vehicle speeds.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference numerals indicate like or corresponding parts and features.

The various figures are schematic representations, and no significance is intended by or to be attributed to the absolute or relative scaling of the various features illustrated therein. Like reference numbers refer to the same or like components in the several figures.

Figure 1:
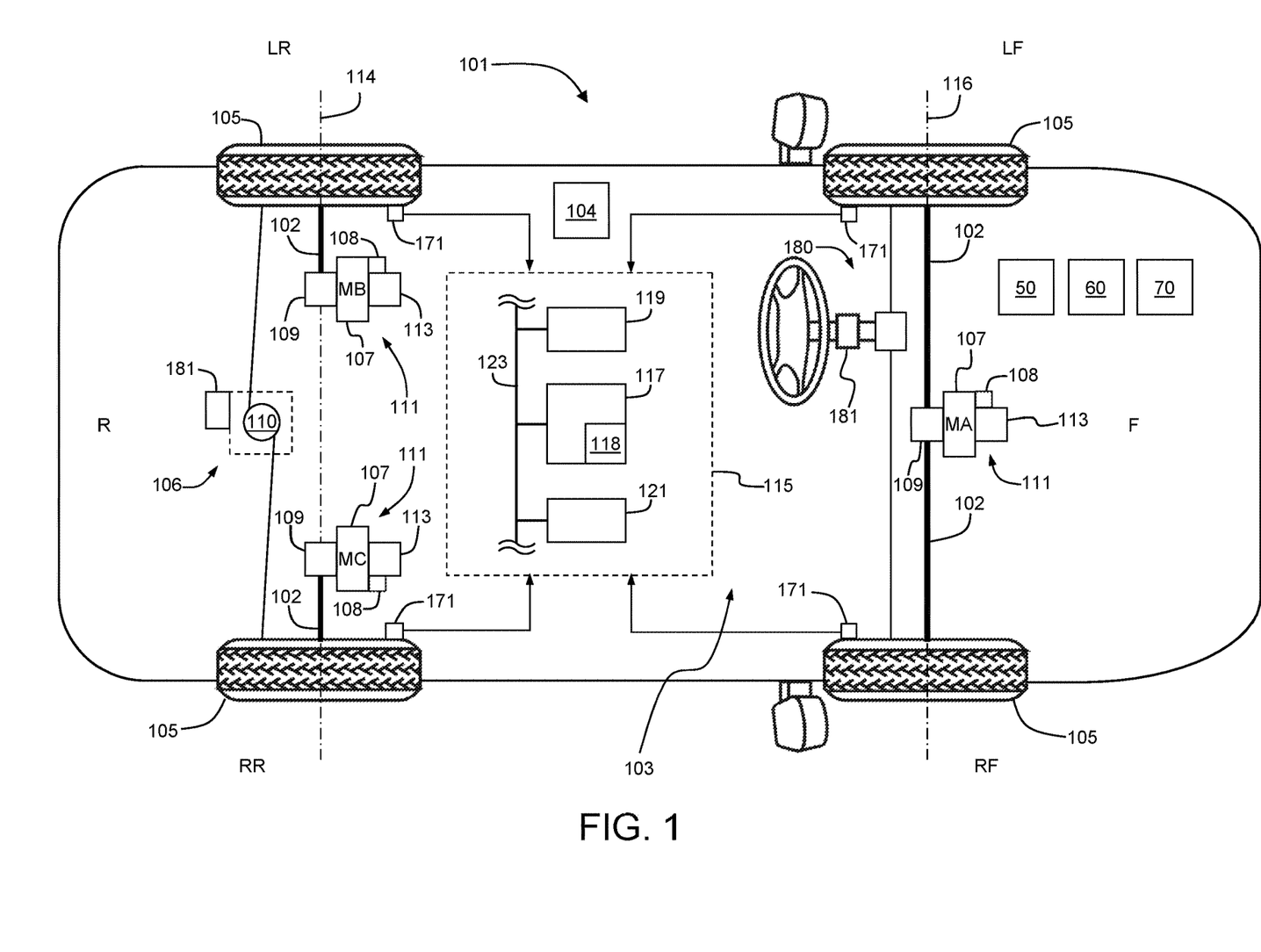
FIG. 1 schematically illustrates an exemplary vehicle which may include an electrical propulsion subsystem and other subsystems, in accordance with the present disclosure.

FIG. 1 schematically illustrates an exemplary vehicle 101 which may include an electrical propulsion subsystem 103. The electrical propulsion subsystem 103 may include various control components, electrical and electro-mechanical systems including, for example, a rechargeable energy storage system (RESS) 104 and at least one electric drive unit (EDU) 111. The electrical propulsion subsystem 103 may be employed on powertrain systems to generate propulsion torque as a replacement for, or in conjunction with, an internal combustion engine in various electric vehicle (EV) applications and hybrid electric vehicle (HEV) applications, respectively. The vehicle 101 is illustrated as a battery electric vehicle (BEV) and RESS 104 is a battery pack (for example at 400 volts DC), though other EVs or HEVs may be employed. Propulsion torque requests or commands may be provided by a control system 115 to a power electronics module 113. In accordance with an embodiment, the vehicle 101 is depicted as a two axle, four wheel vehicle, but it should be appreciated that any other vehicles including one or more axles and one or more wheels for on or off road use may also be used. Axle may refer to a pair of laterally opposing wheels on a vehicle, not necessarily including a physical axle therebetween. Wheel may refer to a single wheel or multiple wheels at one side of an axle, for example as found on a dually pick-up rear axle. The electrical propulsion subsystem 103 may provide propulsion torque to, or react braking torque from, one or more wheels 105 located at the vehicle front (F) positions (i.e., left front (LF) and right front (RF)) and at the vehicle rear (R) positions (i.e., left rear (LR) and right rear (RR)).

Vehicle 101 may include a front axle 116 corresponding to the front wheels 105. Front wheel steering may be effected by a front steering mechanism 180 which may include a steering gear and steering linkages. Steering input (i.e. operator interface) may be by way of a mechanical steering shaft interacting with the steering gear. Mechanical steering effort may be assisted by hydraulic or electrical devices. Alternatively, a steer-by-wire system wherein operator steering intent is determined and, together with other information such as vehicle speed and yaw rate, may actuate the steering gear without the need for the mechanical steering shaft interacting with the steering gear. Front steering angle information may be available via a front steering angle sensor 181.

Vehicle 101 may include a rear axle 114 corresponding to the rear wheels 105. Rear wheel steering may be effected by a rear steering mechanism 106 which may include a steering gear and steering linkages. The rear steering mechanism 106 may include an actuator 110 which causes the steering gear to steer the rear wheels 105 in the desired direction. In one embodiment actuator 110 may be a rotary or linear electric motor or a hydraulic actuator or combination such as an electric-over-hydraulic actuator, for example. Other actuators may be apparent to those having ordinary skill in the art. In another embodiment, the rear steering mechanism 106 may include individual actuator-at-wheel mechanisms such as independent electric actuators. Rear steering angle information may be available via a rear steering angle sensor 181.

The electrical propulsion subsystem 103 may include at least one EDU 111. Each EDU 111 may be of varying complexity, componentry and integration. In one embodiment, the EDU 111 may include at least one electric traction motor (motor) 107, at least one gearbox 109, and at least one power electronics module 113. The EDU 111 is part of an electrical powertrain which includes a motor and driveline components including a gearbox, a wheel assembly and other torque transferring components mechanically coupling the motor to the wheel assembly. The power electronics module 113 may include a motor controller and a traction power inverter and may include other power electronics such as an accessory power module and an onboard charging module. The power electronics module may perform motor control and diagnostics. The motor 107 may be a polyphase AC motor such as a three phase AC motor receiving three-phase AC power over a multi-phase motor control power bus (AC bus) which is coupled to the traction power inverter. In one embodiment, the motor 107 may be a three-phase motor and the traction power inverter may be a three-phase inverter. The traction power inverter may include a plurality of solid-state switches such as IGBTs and power MOSFETs. The traction power inverter may receive DC power over a high voltage (HV) DC bus coupled to the RESS. The motor controller of the power electronics module 113 may be coupled to the traction power inverter for control thereof. The traction power inverter may electrically connect to the motor 107 via the AC bus, with electric current monitored on two or three of the leads thereof. The traction power inverter may be configured with suitable control circuits including paired power transistors (e.g., IGBTs) for transforming high-voltage DC electric power to high-voltage AC electric power and transforming high-voltage AC electric power to high-voltage DC electric power. The traction power inverter may employ pulse width modulation (PWM) control to convert stored DC electric power originating in the RESS to AC electric power to drive the motor 107 to generate torque. Similarly, the traction power inverter may convert mechanical power transferred to the motor 107 to DC electric power to generate electric energy that is storable in the RESS, including as part of a regenerative braking control strategy. It is appreciated that the traction power inverter may be configured to receive motor control commands from the motor controller of the power electronics module 113 and control inverter states to provide the motor drive and regeneration functionality.

In the illustrated embodiment of FIG. 1, the electrical propulsion subsystem 103 includes a single motor front axle configuration with one EDU 111 including motor MA 107 providing propulsion torque to the LF wheel 105 and the RF wheel 105, and a two motor rear axle configuration with one EDU 111 including motor MB 107 providing propulsion torque to the LR wheel 105 and one motor MC 107 providing propulsion torque to the RR wheel 105. The motors 107 are mechanically coupled to respective wheels 105 via respective gear boxes 109, which may include reduction gearing, gear shafts, and differential gearing as may be required, and other driveline components such as drive axles 102. A drive axle 102 may be a simple shaft or may include a pair of constant velocity (CV) joints at opposite ends. The drive axle 102 may be affixed at one end to the gear box 109 at an output and at the other end to the wheel 105, for example by splined couplings. In the illustrated exemplary embodiment of FIG. 1, the motor MA 107 may be mechanically coupled to both the LF and RF wheels 105 through a front gear box 109 integrating a reduction gear set and differential gearing and respective drive axles 102. Such a gear box may provide a single gear ratio or multiple controllably engaged gear ratios. Such a gearbox may include an input mechanically coupled to the motor MA 107 and a LF output mechanically coupled to the LF wheel 105 through a LF drive axle 102 and respective wheel hub and a RF output mechanically coupled to the RF wheel 105 through a RF drive axle 102 and respective wheel hub. In the illustrated exemplary embodiment of FIG. 1, the motor MB 107 may be mechanically coupled to the LR wheel 105 through a respective rear gear box 109 including a reduction gear set and a drive axle 102. Such a gear box may provide a single gear ratio or multiple controllably engaged gear ratios. Since the motor MB 107 is only mechanically coupled to the LR wheel 105, such a gear box does not include differential gearing. Such a gearbox may include an input mechanically coupled to the motor MB 107 and a LR output mechanically coupled to the LR wheel 105 through a LR drive axle 102 and respective wheel hub. Similarly, the motor MC 107 may be mechanically coupled to the RR wheel 105 through a respective rear gear box 109 including a reduction gear set and a drive axle 102. Such a gear box may provide a single gear ratio or multiple controllably engaged gear ratios. Since the motor MC 107 is only mechanically coupled to the RR wheel 105, such a gear box does not include differential gearing. Such a gearbox may include an input mechanically coupled to the motor MC 107 and a RR output mechanically coupled to the RR wheel 105 through a RR drive axle 102 and respective wheel hub. The embodiment of FIG. 1 is exemplary and other mechanical arrangements and power split configurations are contemplated including a single motor configuration with one or more gear boxes providing motor torque distribution to one or more wheels, a single motor rear axle configuration, a dual motor front axle configuration, integrated motor at wheel configurations and various combinations thereof.

The EDUs 111 may provide respective motor speeds, for example via high resolution motor encoders 108. Motor speed may be provided using alternate methods including sensorless techniques. The encoders 108 may provide rotational information to a respective power electronics module 113. Motor encoder information may be processed by the power electronics module 113 to derive motor speed and related quantities such as acceleration and angular position, angular speed and angular acceleration for use by the power electronics module 113 in controlling the respective motor 107.

The vehicle 101 may include a control system 115 which may include one or more electronic control units (ECU) 117. The control system 115 may be responsible for functions related to electrical propulsion subsystem 103 control and diagnostics including, for example, power modes, torque request acquisition and validation, torque management including limits, rates and arbitrations, gear ratio and differential control, RESS state of charge, state of health and thermal management. The control system 115 may also be responsible for control functions related to other vehicle 101 subsystems including, for example, suspension subsystem 50, steering subsystem 60 and braking subsystem 70. Vehicle 101 may include electronic braking control, which may include friction brake application and traction motor control (regenerative braking reaction torque). Electronic braking control may include anti-lock braking functions. Vehicle 101 may include electronic traction control, which may include friction brake application and traction motor control (propulsion torque). Vehicle 101 may include electronic stability control, which may include friction brake application, traction motor control (propulsion/braking torque), electronic steering control (front and/or rear), and electronic suspension active or semi-active control. Vehicle 101 may include active rear steering control for low speed maneuverability (reduced turning radius and lateral "crab" steering) and for high speed stability, for example when towing. Vehicle 101 may include advanced driver assistance systems (ADAS) at various levels which may include friction brake application, traction motor control (propulsion/braking torque), electronic steering control (front and/or rear), and electronic suspension active or semi-active control.

As used herein, electronic control unit (ECU), control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. An ECU may include a variety of communication interfaces including point-to-point or discrete lines and wired or wireless interfaces to networks including wide and local area networks, on vehicle controller area networks and in-plant and service-related networks. Functions of an ECU or a control system as set forth in this disclosure may be performed in a distributed control architecture among several networked ECUs. Software, firmware, programs, instructions, routines, code, algorithms and similar terms mean any ECU executable instruction sets including calibrations, data structures, and look-up tables. An ECU may have a set of control routines executed to provide described functions. Routines are executed, such as by a central processing unit, and are operable to monitor inputs from sensing devices and other networked ECUs and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

The vehicle 101 control system 115 may include numerous ECUs 117, sensors 119, and vehicle-user interface devices 121, may communicate via a communication network 123 and perform control functions and information sharing, including executing control routines locally and in distributed fashion. Communication network may include wired and wireless communications such as, for example, a controller area network (CAN) or short-range wireless communications (SRWC) using appropriate communication protocols for information sharing and routing. The ECUs 117 may include such non-limiting examples as vehicle control modules (VCM), powertrain control modules (PCM), power electronics modules 113, engine control modules (ECM), transmission control modules (TCM), body control modules (BCM), electronic brake control modules (EBCM), traction control or stability control modules, cruise control modules, chassis/suspension control modules, steering control modules, etc. The ECUs 117 may be indirectly or directly connected to a variety of sensors and actuators, as well as to the other ECUs 117 (e.g., via communication network 123). Sensors 119 may include motor encoders and wheel speed sensors, among others. User interface devices may include accelerator and brake pedals, steering wheels, touch screens, gesture and dialogue managers, among others.

The control system 115 may access a variety of information from sensors 119 and various ECUs 117 for use in control of the various vehicle subsystems including electrical propulsion subsystem 103, suspension subsystem 50, steering subsystem 60 and braking subsystem 70 to effect desired functions. Information accessed by the control system 115 may include such non limiting examples as vehicle dynamic and kinematic information such as speed, heading, steering angle, multi-axis accelerations and jerks, yaw, pitch, roll and their derivative quantities, etc. Such information may be generally available over the communication network 123 originating from vehicle sensors such as wheel speed sensors 171 sensing rotation of the wheels 105 at each corner of the vehicle 101, front and rear steering angle sensors 181, and yaw rate sensors, for example. The sensors 119 may provide information as discrete inputs to various directly coupled ECUs 117 or may provide information to the communication network 123. Regardless, sensor information may be accessible to various ECUs 117 via the communication network 123, for example where a sensor may operate as a network node device, or where sensor information is made generally available on the communication network via a directly coupled ECU 117. In one embodiment, an EBCM 118 may monitor wheel speed sensors 171 directly, process the information (e.g., filter) and provide wheel speed information for access by other ECUs 117 via the communication network 123. Wheel speed information based on wheel speed sensors may be referred to as sensed wheel speed or sensed wheel speed information. An EBCM as used herein means an ECU that monitors wheel speed sensors 171, processes wheel speed information from wheel speed sensors 171 and provides wheel speed information for use by other ECUs 117 whether or not braking subsystem control is carried out in the EBCM. Similarly, motor speed information for each motor 107 may be based on a motor encoder and provided by respective power electronics modules 113 for access by the other power electronics modules 113 and other ECUs 117 via the communication network 123.

Wheel speed information, along with other sensor information and vehicle parameters, may be used in various control functions of the vehicle. For example, each of the electrical propulsion subsystem 103, suspension subsystem 50, steering subsystem 60 and braking subsystem 70 may use wheel speed information in the control of various actuators to effect various desired functions. Therefore, control of the electrical propulsion subsystem 103, suspension subsystem 50, steering subsystem 60 and braking subsystem 70 may require or depend upon wheel speed information integrity. Control of a subsystem which uses wheel speed information may be said to be based on wheel speed or based on wheel speed information. For example, the electrical propulsion subsystem 103 may use individual wheel speed information at each corner of the vehicle in torque vectoring and electronic differential control. The suspension subsystem 50 may use wheel speed information in roll control, brake dive and launch control. The steering subsystem 60 may use wheel speed information in front and rear steering angle control during low and high speed maneuvers. And, the braking subsystem 70 may use wheel speed information in traction control, stability control and anti-lock brake control.

Figure 2:
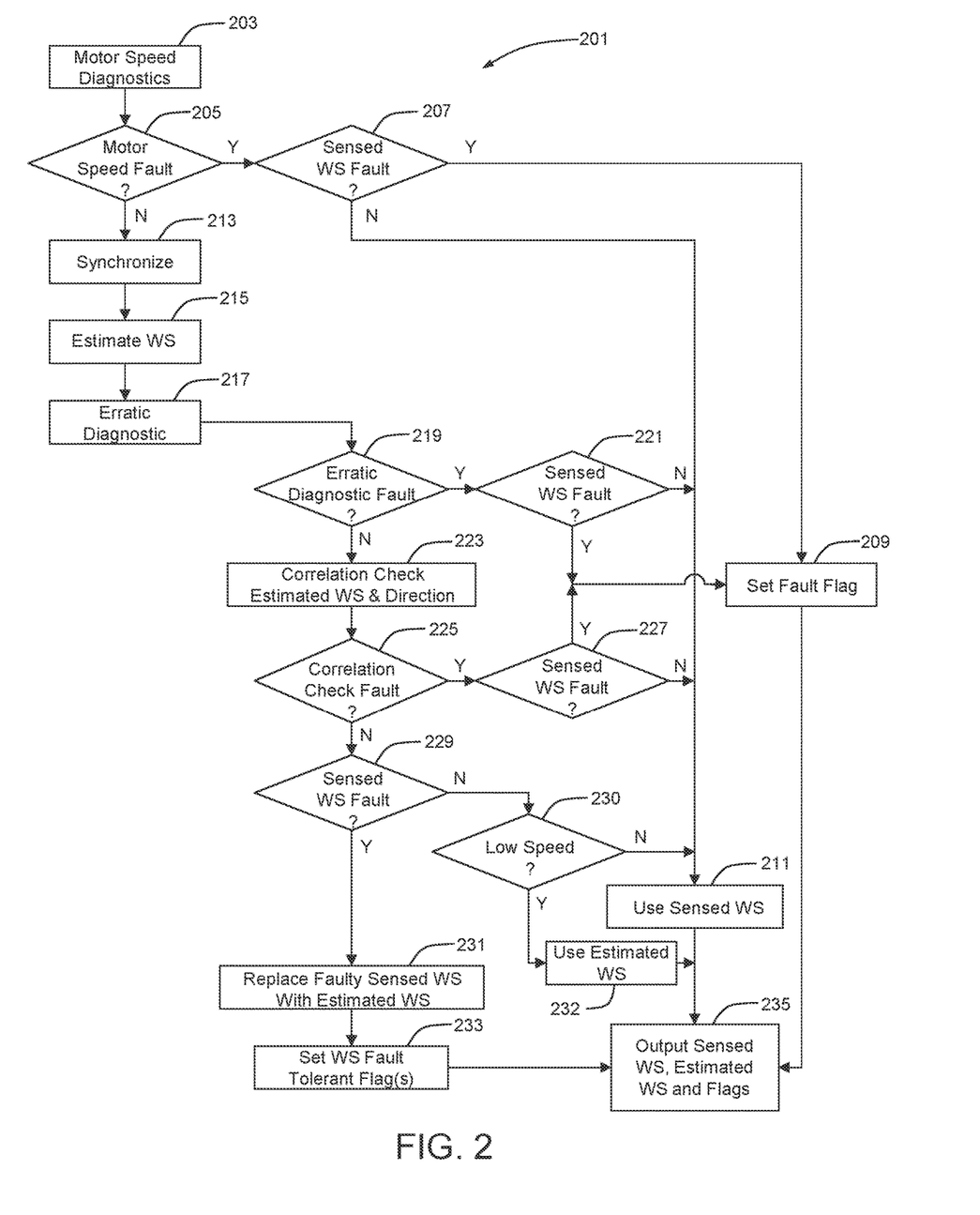
FIG. 2 illustrates a routine for performing various tasks, in accordance with the present disclosure.

The control system 115 may perform sensed wheel speed diagnostics and recovery routines whereby motor speed information from the EDUs 111 may provide a source of redundancy and backup to sensed wheel speed information. In one embodiment, the EBCM 118 may execute a routine 201 as illustrated in FIG. 2. The routine may be stored on non-transitory computer readable storage medium and include computer readable program instructions for causing a processor to carry out aspects of the present disclosure. The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The computer readable program instructions may also be loaded onto a computer, other programmable data processing apparatus, or other device to cause a series of operational tasks to be performed on the computer, other programmable apparatus or other devices to produce a computer implemented process, such that the instructions which execute on the computer, other programmable apparatus, or other device implement the functions/acts exemplified in the flowchart and/or block diagram block or blocks of the routine 201 illustrated in FIG. 2.

The routine 201 initializes at 203 where motor diagnostic data is provided by the power electronics modules 113 of the EDUs 111 and read into the EBCM 118. While the routine 201 may be described with respect to a single corner of the vehicle, all corners of the vehicle are evaluated by the routine 201. A motor speed fault check is performed at 205 to determine whether the motor speed information is deemed good, for example the encoder 108 and harness are free from open circuit and short circuit conditions and the motor speed information is free from speed errors. Such fault check may include checking fault flag information passed to the EBCM 118 from the power electronics module 113 or processing motor speed information at the EBCM 118 in a local diagnostic routine. A motor speed fault at 205 results in the routine 201 proceeding to 207 whereas no motor speed fault results in the routine proceeding to 213. A sensed wheel speed fault check is performed at 207 to determine whether the sensed wheel speed is deemed good, for example the wheel speed sensor 171 and harness are free from open circuit and short circuit conditions and the sensed wheel speed is free from speed errors. Such fault check may include checking fault flag information passed to the routine 201 from EBCM 118 diagnostic routines or processing sensed wheel speed in a local diagnostic routine. A sensed wheel speed fault at 207 results in the routine 201 proceeding to 209, whereas no sensed wheel speed fault results in the routine proceeding to 211. A fault flag may be set at 209 indicative of simultaneous motor speed and sensed wheel speed faults. Sensed wheel speed, having been determined good at 207, may be designated for use in the control of various subsystems which use wheel speed information at 211. Each of 209 and 211 proceed to 235.

A synchronization of motor speed and wheel speed is performed at 213 when the motor speed has been deemed good at 205. Synchronization may be desirable when, for example, different sampling rates are employed for the motor speed and the sensed wheel speed. In one embodiment, motor speed may be synchronized to sensed wheel speed by an interpolative process, for example by using a pair of time series samples of motor speed that flank a given time series sample of sensed wheel speed. Other synchronization processes such as upscaling and downscaling may be utilized.

Figure 3:
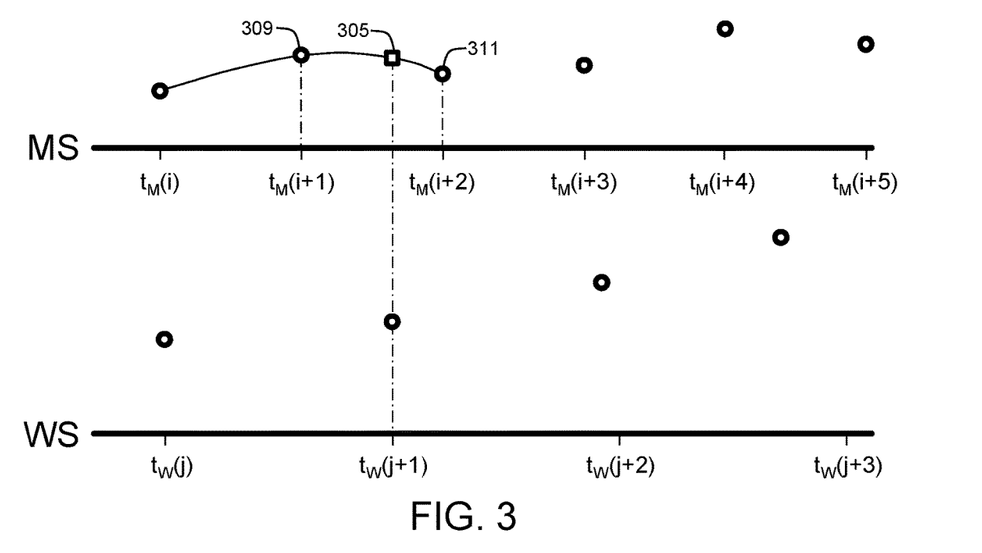
FIG. 3 illustrates graphical representation of a one-dimensional interpolation, in accordance with the present disclosure.

With reference to FIG. 3, a simplified graphical representation of a one-dimensional interpolation is shown. From FIG. 3, it is appreciated that the motor speed (MS) has a higher sampling rate than the sensed wheel speed (WS). Sampling of motor speed occurs at a time step (i) and sampling of sensed wheel speed is at a time step (j) where (i)<(j). Motor speed is desirably synchronized to sensed wheel speed. Thus, synchronized motor speed samples will correspond to sensed wheel speed samples taken at time steps (j). For example, a synchronized motor speed sample 305 at a sensed wheel speed sample time $t_W(j+1)$ is interpolated from motor speed samples 309 and 311 at motor speed sample times $t_M(i+1)$ and $t_M(i+2)$, respectively. The synchronized motor speed (e.g., 305) may be determined from a linear interpolation relying on the two flanking motor speed samples, a polynomial interpolation requiring additional motor speed samples, a nearest, prior or next value interpolation, or any other interpolation technique that is suitable for the relative sampling rates and anticipated system performance. Series of synchronized motor speed samples may be subjected to the same or similar filtering and processing as the sensed wheel speed samples.

Subsequent to synchronization of the motor speed and the sensed wheel speed, estimated wheel speed is calculated at 215 based on the synchronized motor speed. Estimated wheel speed may be determined as a function of the mechanical ratio of the gearbox mechanically coupling the motor 107 and wheel 105. Estimated wheel speed based on motor speed may be referred to as estimated wheel speed or estimated wheel speed information. A transfer function based on mechanical dynamic models of the electrical powertrain may be employed to account for certain effects of driveline components. Mechanical dynamic models may be used to derive force balance relationships of the electrical powertrain including the motor 107 and the driveline, and more specifically in the torque domain. The wheel assembly may include a tire mounted on a wheel affixed to a hub. Wheel as used herein may refer to a wheel assembly as described or a functional equivalent.

Figure 4:
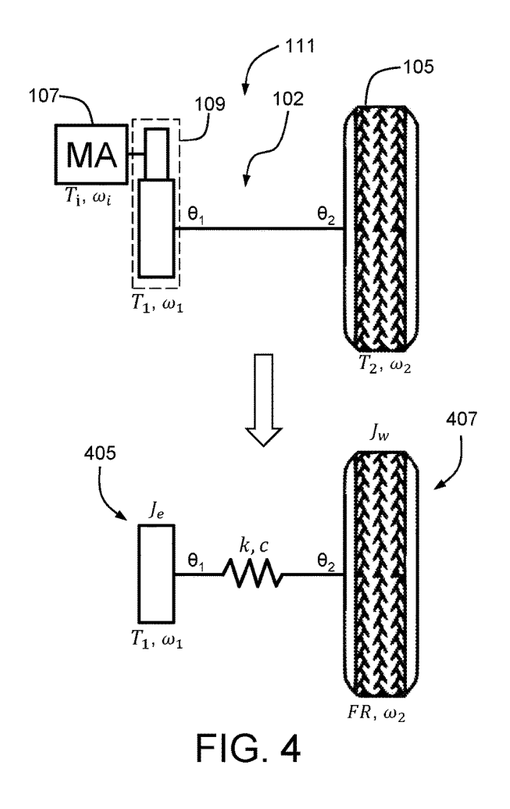
FIG. 4 illustrates a simplified driveline schematic, in accordance with the present disclosure.
Figure 5:
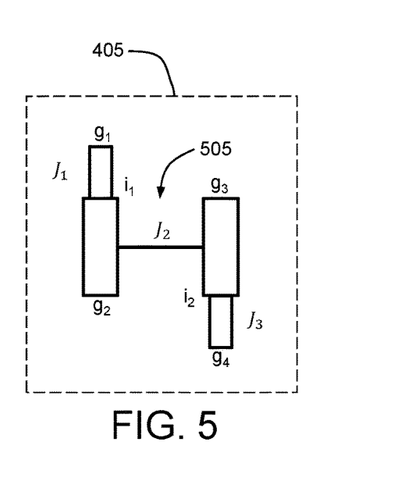
FIG. 5 illustrates rotational models, in accordance with the present disclosure.

A simplified driveline schematic is illustrated in FIG. 4 and provides the basis for a pair of torque balance relationships corresponding to the front driveline of FIG. 1 relative to the single motor front axle EDU 111, one of the front wheels 105 and the corresponding drive axle 102. With reference to FIG. 4, mechanical portions of the front axle EDU 111 are schematically represented including motor MA 107 and the gear box 109. The effective gear box output torque ($T_1$) and effective gear box output speed ($\omega_1$) may be determined from the gear box gear ratio and the motor input torque ($T_i$) and motor input speed ($\omega_i$). FIG. 4 thus shows a further simplification equivalence by lumping together the rotating components of the motor MA 107 and the gear box 107 into an equivalent rotational model 405 including equivalent rotational inertia ($J_e$), the effective gear box output torque ($T_1$) and the effective gear box output speed ($\omega_1$). The equivalent rotational inertia ($J_e$) may be represented by the following relationship in conjunction with the exemplary configuration of FIG. 5.

$$J_e = i_1^2 i_2^2 \left( \frac{0.5 J_2}{i_1^2} + J_1 \right) + 0.5 J_2 i_2^2 + J_3 \quad [1]$$

FIG. 5 schematically represents the equivalent rotational model 405 at the gear box side including an exemplary compound ordinary gear train 505 wherein ($g_1$-$g_4$) represent the gear box gears with an input at simple input gear ($g_1$), output at simple output gear ($g_4$), and compounding of intermediate gears ($g_2$) and ($g_3$). The rotational inertia ($J_1$) represents the combined rotational inertia of the rotor assembly of the motor MA 107 and input gear ($g_1$). The rotational inertia ($J_2$) represents the combined rotational inertia of the rotor assembly of the compound intermediate gears ($g_2$) and ($g_3$). And the rotational inertia ($J_3$) represents the rotational inertia of the output gear ($g_4$). The ($g_1$) to ($g_2$) ratio is represented by $i_1$ and the ($g_3$) to ($g_4$) ratio is represented by $i_2$. Other gear train arrangements will have other equivalent rotational model representations and may have a corresponding equivalent rotational inertia determined in accordance with the respective arrangement as is appreciated by one having ordinary skill in the art.

With continued reference to FIG. 4, the drive axle 102 and wheel 105 are also schematically represented. The wheel input torque is represented by ($T_2$) and wheel speed is represented by ($\omega_2$). The drive axle is modeled as an active component including a torsional spring constant (k) which may be measured quantity, a torsional damping constant (c) which may be tuned through empirical correlations of estimated and sensed wheel speed in practice, rotation angle at the output of the gear box (i.e., input end of the drive axle) ($\theta_1$), and rotation angle at the wheel ($\theta_2$). FIG. 4 shows a further equivalence at the wheel 105 by representing the wheel input torque ($T_2$) as the product of tangential road force (F) and the wheel radius (R) in an equivalent rotational model 407 at the wheel side including equivalent rotational inertia ($J_W$), the wheel input torque ($T_2$)=(FR) and the wheel speed ($\omega_2$).

From the equivalent rotational models (405, 407) and drive axle model, a pair of torque balance relationships for the front driveline of FIG. 1 may be represented as follows:

$$J_e \ddot{\theta}_1 = T_1 - T_{f1} - k(\theta_1 - \theta_2) - c(\dot{\theta}_1 - \dot{\theta}_2) \quad [2]$$

$$J_w \ddot{\theta}_2 = k(\theta_1 - \theta_2) + c(\dot{\theta}_1 - \dot{\theta}_2) - FR - T_{f2} \quad [3]$$

wherein single over dot notation indicates a first derivative and double over dot notation indicates a second derivative.

Thus, ($\dot{\theta}_1$) and ($\dot{\theta}_2$) represent angular velocity at the gear box side and wheel side, respectively, and ($\ddot{\theta}_1$) and ($\ddot{\theta}_2$) represents angular acceleration at the gear box side and wheel side, respectively. ($T_{f1}$) represents gear box side friction losses and ($T_{f2}$) represent wheel side friction losses. Friction losses are assumed to be inconsequential in the present application and thus assumed to be zero. Thus, the pair of torque balance relationships [2] and [3] may be further simplified to the following torque balance relationships:

$$J_e\ddot{\theta}_1 = T_1 - k(\theta_1 - \theta_2) - c(\dot{\theta}_1 - \dot{\theta}_2) \quad [4]$$

$$J_w\ddot{\theta}_2 = k(\theta_1 - \theta_2) + c(\dot{\theta}_1 - \dot{\theta}_2) - FR \quad [5]$$

($k(\theta_1-\theta_2)$) represents a torsional spring reaction torque of the drive axle 102 and ($c(\dot{\theta}_1-\dot{\theta}_2)$) represents a torsional damping torque of the drive axle 102. Assuming no slip between the wheel and the road surface, and further assuming horizontal grade, the tangential road force (F) may follow the relationship F=ηma, where η is the percentage of the total longitudinal force that is applied to the axle, m is the vehicle mass and α is the vehicle longitudinal acceleration. With no wheel slip, the following equivalence is assumed: α=(ωR)'=Rω'=R$\ddot{\theta}_2$. Thus, through substitution, F=ηmR$\ddot{\theta}_2$, FR=ηmR$^2\ddot{\theta}_2$ and the torque balance relationship [5] may be rewritten as follows:

$$J_w\ddot{\theta}_2 = k(\theta_1-\theta_2) + c(\dot{\theta}_1-\dot{\theta}_2) - \eta mR^2\ddot{\theta}_2 \quad [6]$$

Having thus defined the front driveline of FIG. 1 by the pair of torque balance relationships as set forth herein, a transfer function may be derived based on classic Laplace transformations as follows:

$$\frac{\omega_2(s)}{\omega_1(s)} = \frac{s\theta_2(s)}{s\theta_1(s)} = \frac{\dot{\theta}_2(s)}{\dot{\theta}_1(s)} = \frac{cs+k}{(J_w+\eta mR^2)s^2+cs+k} \quad [7]$$

The relationship [7] may be simplified to wheel speed ($\omega_2$) and gear box output speed ($\omega_1$) since wheel speed is the desired estimation and since angular quantities in θ and derivatives thereof are not actually measured. Thus, a second order transfer function solvable for estimating the wheel speed ($\omega_2$) is set forth as follows:

$$\frac{\omega_2(s)}{\omega_1(s)} = \frac{cs+k}{(J_w+\eta mR^2)s^2+cs+k} \quad [8]$$

Subsequent to calculation of an estimated wheel speed based on the motor speed at 215, various additional diagnostics may be performed on the estimated wheel speed. For example, at 217 an erratic diagnostic routine may be performed. At 219, when an erratic diagnostic fault exists the routine 201 proceeds to 221. A sensed wheel speed fault check is performed at 221 to determine whether the sensed wheel speed information is deemed good, for example the wheel speed sensor 171 and harness are free from open circuit and short circuit conditions and the sensed wheel speed is free from speed errors. Such fault check may include checking fault flag information passed to the routine 201 from EBCM 118 diagnostic routines or processing sensed wheel speed in a local diagnostic routine. A sensed wheel speed fault at 221 results in the routine 201 proceeding to 209 whereas no sensed wheel speed fault results in the routine proceeding to 211. A fault flag may be set at 209 indicative of simultaneous estimated wheel speed erratic and sensed wheel speed faults. Sensed wheel speed, having been determined good at 221, may be designated for use in the control of various subsystems which use wheel speed information at 211. Each of 209 and 211 proceed to 235. At 219, when no erratic diagnostic fault exists the routine 201 proceeds to 223. Correlation and other rationality diagnostics may be performed at 223, for example to determine all estimated wheel speeds are magnitudinally and directionally consistent and rational. At 225, when a rationality diagnostic fault exists the routine 201 proceeds to 227. A sensed wheel speed fault check is performed at 227 to determine whether the sensed wheel speed is deemed good, for example the wheel speed sensor 171 and harness are free from open circuit and short circuit conditions and the sensed wheel speed is free from speed errors. Such fault check may include checking fault flag information passed to the routine 201 from EBCM 118 diagnostic routines or processing sensed wheel speed in a local diagnostic routine. A sensed wheel speed fault at 227 results in the routine 201 proceeding to 209 whereas no sensed wheel speed fault results in the routine proceeding to 211. A fault flag may be set at 209 indicative of simultaneous estimated wheel speed rationality and sensed wheel speed faults. Sensed wheel speed, having been determined good at 227, may be designated for use in the control of various subsystems which use wheel speed information at 211. Each of 209 and 211 proceed to 235. At 225, when no rationality diagnostic fault exists the routine 201 proceeds to 229.

A sensed wheel speed fault check is performed at 229 to determine whether the sensed wheel speed is deemed good, for example the wheel speed sensor 171 and harness are free from open circuit and short circuit conditions and the sensed wheel speed is free from speed errors. Such fault check may include checking fault flag information passed to the routine 201 from EBCM 118 diagnostic routines or processing sensed wheel speed in a local diagnostic routine. A sensed wheel speed fault at 229 results in the routine 201 proceeding to 231 whereas no sensed wheel speed fault results in the routine proceeding to 230.

When there are no motor speed faults at 205, no erratic, rationality, or other estimated wheel speed faults at 217, 219, 223, 225, and sensed wheel speed is not deemed faulty at 229, the routine 201 proceeds to 230. When the vehicle speed is not low, e.g., as may be determined by comparison of estimated wheel speed or sensed wheel speed to a predetermined threshold, sensed wheel speed may be designated for use in the control of various subsystems which use wheel speed information at 211. When the vehicle speed is low, estimated wheel speed may be designated for use in the control of various subsystems which use wheel speed information at 232. Each of 211 and 232 proceed to 235.

When there are no motor speed faults at 205, no erratic, rationality, or other estimated wheel speed faults at 217, 219, 223, 225, and sensed wheel speed is deemed faulty at 229, estimated wheel speed is designated in place of the faulty sensed wheel speed for use in the control of various subsystems which use wheel speed information at 231. The system is notified of replacement of sensed wheel speed with estimated wheel speed by setting appropriate fault tolerant flags which identify faulty sensed wheel speed and replacement estimated wheel speed at 233.

The estimated wheel speed designated for use, the sensed wheel speed designated for use, motor speed fault flags, wheel speed fault flags, and fault tolerant flags are then output and made available for consumption and use by the various subsystems in their control at 235. Therefore, estimated wheel speed, based on motor speed information, may be employed anywhere wheel speed information may be employed. Estimated wheel speed may be substituted in place of sensed wheel speed that has been diagnosed as faulty. Estimated wheel speed may also be used in place of sensed wheel speed based on other conditions or considerations. For example, estimated wheel speed may be used in place of sensed wheel speed at low vehicle speeds regardless of the fault status of sensed wheel speed. Estimated or sensed wheel speed may be used in the control of the various vehicle subsystems including electrical propulsion subsystem 103, suspension subsystem 50, steering subsystem 60 and braking subsystem 70. Thus, the electrical propulsion subsystem 103 may use estimated or sensed wheel speed at each corner of the vehicle in torque vectoring and electronic differential control. The suspension subsystem 50 may use estimated or sensed wheel speed in roll control, brake dive and launch control. The steering subsystem 60 may use estimated or sensed wheel speed in front and rear steering angle control during low and high speed maneuvers. The braking subsystem 70 may use estimated or sensed wheel speed at each corner of the vehicle in traction control, stability control and anti-lock brake control.

All numeric values herein are assumed to be modified by the term "about", whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally.

Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An apparatus for wheel speed estimation, comprising:
   an electrical powertrain including an electric motor providing a motor speed, a wheel, and a mechanical coupling between the motor and the wheel; and
   an electronic control unit calculating an estimated wheel speed based on the motor speed and mechanical dynamic models of the electrical powertrain,
   wherein the mechanical dynamic models of the electrical powertrain comprise a drive axle modeled as an active component including a torsional spring constant, a torsional damping constant, a rotation angle at an output of a gear box, and a rotation angle at the wheel.

2. The apparatus of claim 1 wherein the electronic control unit synchronizes the motor speed to a sensed wheel speed.

3. The apparatus of claim 1 wherein the electronic control unit processes a sensed wheel speed.

4. The apparatus of claim 1 wherein the mechanical coupling between the motor and the wheel comprises the gear box and the drive axle.

5. The apparatus of claim 1 wherein the mechanical dynamic models of the electrical powertrain further comprise an equivalent rotational model of the electric motor and the gear box.

6. The apparatus of claim 5 wherein the estimated wheel speed is calculated from a second order transfer function derived from the mechanical dynamic models of the electrical powertrain.

7. The apparatus of claim 1 wherein the electric motor providing a motor speed comprises the electric motor providing the motor speed based upon a motor encoder.

8. A method for wheel speed estimation in an electrical powertrain, comprising:
   driving a wheel with an electric motor; and
   calculating an estimated wheel speed based on a speed of the electric motor and mechanical dynamic models of the electrical powertrain,
   wherein the mechanical dynamic models of the electrical powertrain comprise a drive axle modeled as an active component including a torsional spring constant, a torsional damping constant, a rotation angle at an input end of a drive axle, and a rotation angle at the wheel.

9. The method of claim 8, wherein the speed of the electric motor is synchronized to a sensed wheel speed.

10. The method of claim 8, wherein the electrical powertrain comprises the drive axle mechanically coupled between the wheel and the electrical motor.

11. The method of claim 10, wherein the electrical powertrain further comprises a gear box mechanically coupled between the electrical motor and the drive axle, and wherein the mechanical dynamic models of the electrical powertrain further comprise an equivalent rotational model of the electric motor and the gear box.

12. The method of claim 11, wherein the estimated wheel speed is calculated from a second order transfer function derived from the mechanical dynamic models of the electrical powertrain.

13. An electric motor driven vehicle, comprising:
   an electrical powertrain comprising:
      an electrical drive unit including an electric motor mechanically coupled to an input of a gear box, and a motor controller providing a motor speed from an encoder;
      a wheel; and
      a drive axle mechanically coupling the wheel to an output of the gear box; and
   an electronic control unit:
      calculating an estimated wheel speed based on the motor speed and mechanical dynamic models of the electrical powertrain;
      processing sensed wheel speed from a wheel speed sensor; and providing the sensed wheel speed and the estimated wheel speed to a vehicle subsystem controlled based on wheel speed information, wherein the mechanical dynamic models of the electrical powertrain comprise the drive axle modeled as an active component including a torsional spring constant (k), a torsional damping constant (c), a rotation angle at an output of the gear box ($\theta_1$), and a rotation angle at the wheel ($\theta_2$).

14. The electric motor driven vehicle of claim 13, wherein the vehicle subsystem comprises at least one of an electrical propulsion subsystem, a suspension subsystem, a steering subsystem, and a braking subsystem.

15. The electric motor driven vehicle of claim 13 wherein the mechanical dynamic models of the electrical powertrain further comprise an equivalent rotational model of the electric motor and the gear box.

16. The electric motor driven vehicle of claim 15 wherein the estimated wheel speed is calculated from a second order transfer function derived from the mechanical dynamic models of the electrical powertrain.

17. The electric motor driven vehicle of claim 13, wherein the estimated wheel speed is used by the vehicle subsystem when the sensed wheel speed is faulty.

18. The electric motor driven vehicle of claim 13, wherein the estimated wheel speed is used by the vehicle subsystem when a vehicle speed is below a threshold.

* * * * *